US009304729B2

(12) United States Patent
Ohara

(10) Patent No.: US 9,304,729 B2
(45) Date of Patent: Apr. 5, 2016

(54) CLIENT DEVICE, PRINT DEVICE AND NON-TRANSITORY COMPUTER READABLE MEDIUM FOR REALIZING PRINT OF TARGET IMAGE REPRESENTED BY TARGET DATA

(71) Applicant: Kiyotaka Ohara, Nagoya (JP)

(72) Inventor: Kiyotaka Ohara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/055,434

(22) Filed: Oct. 16, 2013

(65) Prior Publication Data

US 2014/0043641 A1 Feb. 13, 2014

Related U.S. Application Data

(63) Continuation of application No. 13/216,789, filed on Aug. 24, 2011, now Pat. No. 8,570,577.

(30) Foreign Application Priority Data

Aug. 26, 2010 (JP) .................................. 2010-189277

(51) Int. Cl.
*G06F 3/12* (2006.01)
*G06Q 10/06* (2012.01)

(52) U.S. Cl.
CPC ............ *G06F 3/1297* (2013.01); *G06F 3/1204* (2013.01); *G06F 3/1206* (2013.01); *G06F 3/1247* (2013.01); *G06F 3/1275* (2013.01);
(Continued)

(58) Field of Classification Search
USPC ................................................ 358/1.13–1.18
See application file for complete search history.

(56) References Cited

U.S. PATENT DOCUMENTS 6,266,150 B1 7/2001 Brossman et al.
6,407,823 B1 6/2002 Aoki
(Continued)

FOREIGN PATENT DOCUMENTS

JP 10-207657 A 8/1998
JP 11-154063 A 6/1999
(Continued)

OTHER PUBLICATIONS

Notification of Reasons for Rejection dated Jan. 21, 2014 from related Japanese Application No. 2010-189277, together with an English language translation.
(Continued)

*Primary Examiner* — Fan Zhang
(74) *Attorney, Agent, or Firm* — Scully, Scott, Murphy & Presser, P.C.

(57) ABSTRACT

A client device may cause an information memory to store communication information related to whether or not two devices are capable of directly communicating, and decide a specific communication path using the communication information. The specific communication path may be a path capable of supplying print data to a print device. The client device may send a print indication to a first device that is to perform a process performed first among one or more processes performed sequentially for realizing a print. In a case where a data format of target data is not a data format which the print device is capable of interpreting, the client device may decide the specific communication path such that the converting device is present on the specific communication path.

3 Claims, 13 Drawing Sheets

(52) U.S. Cl.
CPC ............ *G06F 3/1288* (2013.01); *G06F 3/1289* (2013.01); *G06F 3/1292* (2013.01); *G06Q 10/06* (2013.01); *G06F 3/126* (2013.01)

(56) References Cited

U.S. PATENT DOCUMENTS

| | | |
|---|---|---|
| 6,462,756 B1 | 10/2002 | Hansen et al. |
| 6,745,256 B2 | 6/2004 | Suzuki et al. |
| 7,075,670 B1 | 7/2006 | Koga |
| 7,167,258 B2 | 1/2007 | Yamamoto |
| 7,298,509 B2 | 11/2007 | Sandfort et al. |
| 7,861,182 B2 | 12/2010 | Liu |
| 7,876,465 B2 | 1/2011 | Matsueda |
| 8,171,117 B2 | 5/2012 | Rhodes et al. |
| 2001/0030766 A1 | 10/2001 | Yamamoto |
| 2001/0043352 A1 | 11/2001 | Brossman et al. |
| 2001/0052995 A1 | 12/2001 | Idehara |
| 2002/0078012 A1 | 6/2002 | Ryan et al. |
| 2003/0053118 A1 | 3/2003 | Muramoto et al. |
| 2005/0264838 A1 | 12/2005 | Kim |
| 2006/0192999 A1 | 8/2006 | Kawai |
| 2007/0011037 A1 | 1/2007 | Demizu et al. |
| 2008/0068649 A1* | 3/2008 | Emori .................. 358/1.15 |
| 2009/0033978 A1 | 2/2009 | Morales |

FOREIGN PATENT DOCUMENTS

| | | |
|---|---|---|
| JP | 2000-298569 | 10/2000 |
| JP | 2006-236062 A | 9/2006 |
| JP | 2008-102903 | 5/2008 |
| JP | 2010-89406 A | 4/2010 |

OTHER PUBLICATIONS

Extended European Search Report dated Jun. 6, 2013 received in related application EP 11178668.7—1959.
United States Official Action dated Mar. 1, 2013 from related U.S. Appl. No. 13/216,789.
Notice of Allowance dated Jun. 25, 2013 from related U.S. Appl. No. 13/216,789.
Japanese Notification of Reason for Rejection dated Mar. 31, 2015 issued in corresponding Japanese Patent Application No. 2014-095781.

* cited by examiner

FIG. 9

(Case A) In a Case of Format of Target Data ≠ Printer Format of Printer

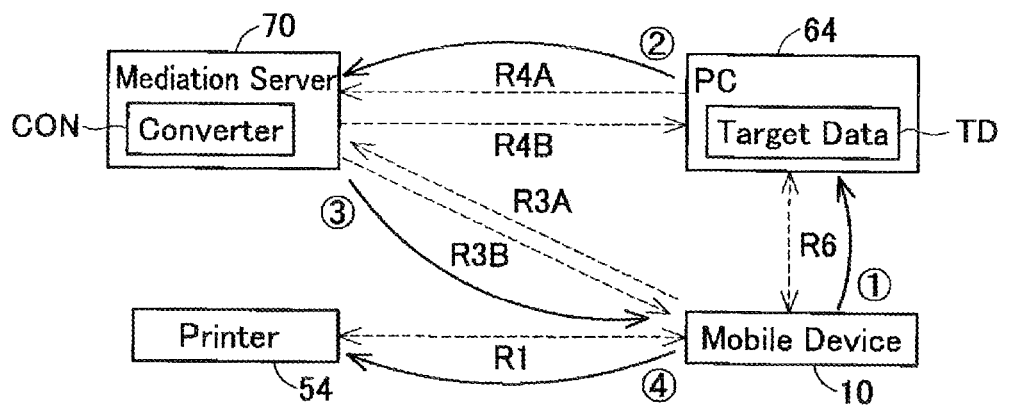

(Accept R6→R4A→R3B→R1)

Print Indication Data 200a

- ☐ PC Sends Print Indication Data Attaching Target Data to Mediation Server
- ☐ Mediation Server Converts Target Data and Sends Print Indication Data Attaching Converted Data to Mobile Device
- ☐ Mobile Device Sends Print Indication Data to Printer
- ☐ Printer Performs Printing // CLIENT DEVICE, PRINT DEVICE AND NON-TRANSITORY COMPUTER READABLE MEDIUM FOR REALIZING PRINT OF TARGET IMAGE REPRESENTED BY TARGET DATA

CROSS-REFERENCE TO RELATED APPLICATIONS

This application is a continuation application of U.S. application Ser. No. 13/216,789 filed on Aug. 24, 2011, which claims benefit of Japanese Patent Application No. 2010-189277, filed on Aug. 26, 2010, the contents of both of which are hereby incorporated by reference into the present application.

TECHNICAL FIELD

The present specification discloses a planning device for planning a procedure for causing a print device to perform a print of a target image.

DESCRIPTION OF RELATED ART

A system comprising a plurality of devices including a client PC, a path detecting server, a plurality of print servers and a plurality of printers is known. Each of the plurality of print servers converts a data format of target data of a print target to a data format that a printer is capable of interpreting. However, the data format that each of the plurality of print servers is capable of interpreting differs. Further, the data format that each of the plurality of printers is capable of interpreting differs. Accordingly, when a print instruction is input to the client PC, the path detecting server decides, based on the data format of the target data, a communication path which indicates which print server will convert the target data, and which printer the converted data should be sent to.

SUMMARY

In the above system, it is assumed that all the devices are capable of communicating with each other. However, a system can also be built in which not all the devices are capable of communicating with each other. In the above art, a communication path could e.g. be decided for sending target data from a first device to a second device even in the situation where a system thereof has been built such that the target data cannot be sent from the first device to the second device. In this case, the target data cannot be sent properly, and consequently the print of an image represented by the target data cannot be performed.

In the present specification, an art is taught that can prevent the occurrence of the print of the image represented by the target data not being performed.

An art disclosed by the present specification is a planning device used in a system. The system may comprise a plurality of devices including a storage device for storing target data of a print target, a print device for performing a print of a target image represented by the target data and the planning device for planning a procedure for causing the print device to perform the print of the target image. The planning device may comprise a memory, a deciding unit, a generating unit and a sending unit. The memory may be configured to store, for each combination of two devices among the plurality of devices, communication information related to whether or not the two devices composing the combination are capable of directly communicating. The deciding unit may be configured to decide a specific communication path using the communication information in the memory. The specific communication path may be a path capable of supplying print data acquired from the target data in the storage device to the print device. The print data may have a data format which the print device is capable of interpreting. The generating unit may be configured to generate procedure data for instructing one or more devices which are present on the specific communication path to perform one or more processes sequentially for realizing the print of the target image. The sending unit may be configured to send the procedure data to a first device, among the one or more devices. The first device may be a device that is to perform a process performed first among the one or more processes.

A control method and a computer program for realizing the planning device described above, and a non-transitory computer readable recording device which includes the computer program, are also novel and useful. Further, a system comprising the plurality of devices described above and a method used by the system are also novel and useful.

BRIEF DESCRIPTION OF THE DRAWINGS

FIG. 9 shows a case A in which a converter is required.

EMBODIMENT

Configuration of System

Figure 1:
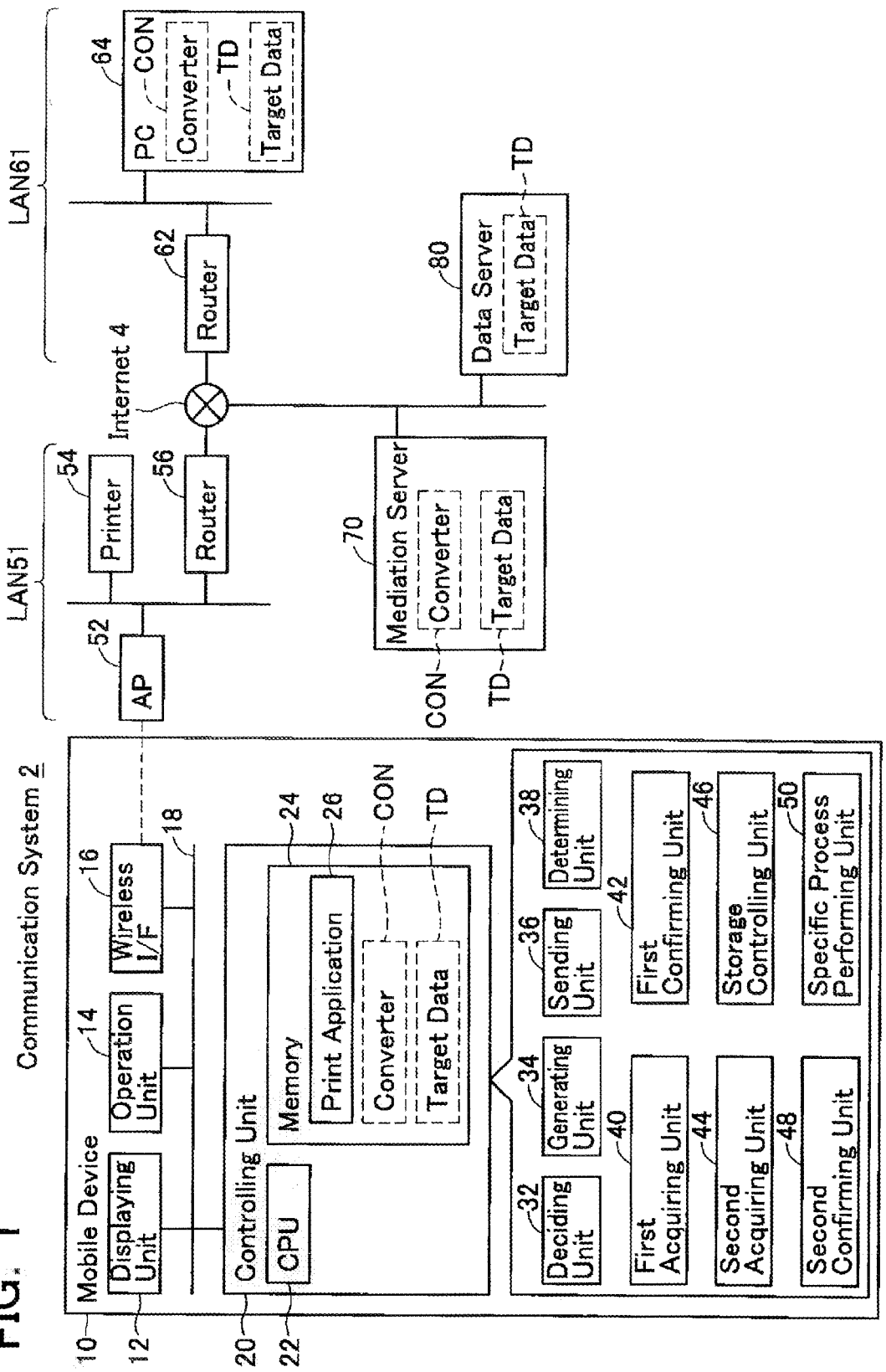
FIG. 1 shows a configuration of a communication system of an embodiment.

As shown in FIG. 1, a communication system 2 comprises a mobile device 10, a plurality of LANs 51, 61 and a plurality of servers 70, 80 on the Internet.

(Configuration of Mobile Device 10)

The mobile device 10 is a portable terminal device such as, e.g., a mobile phone, a PDA, a portable music player, a notebook PC, a tablet PC, etc. The mobile device 10 comprises a displaying unit 12, an operating unit 14, a wireless interface 16 and a controlling unit 20. The units 12, 14, 16, 20 are connected to a bus line 18. The displaying unit 12 is a display for showing various types of information. The operating unit 14 consists of a plurality of keys. A user of the mobile device 10 can input various types of information to the mobile device 10 by operating the operating unit 14. The wireless interface 16 is an interface for wireless communication. Moreover, in the state of FIG. 1, the mobile device 10 is wirelessly connected to the LAN 51 via the wireless interface 16.

The controlling unit 20 comprises a CPU 22 and a memory 24. The memory 24 stores a print application 26. The print application 26 is a program for realizing the processes of FIGS. 3 to 8, to be described later. The print application 26 may be installed in the mobile device 10 from, e.g., a server provided by a manufacturer of a printer 54. Further, the print application 26 may be installed in the mobile device 10 from, e.g., media (i.e., a computer readable recording device) provided by the manufacturer of the printer 54 (media packaged together with the printer 54 at the shipment stage of the printer 54).

The CPU 22 performs processes according to the print application 26 stored in the memory 24. The CPU 22 realizes the functions of the units 32 to 50 by performing the processes according to the print application 26. The memory 24 further stores an OS program, a web browser program, etc. (not shown), and the CPU 22 can also perform processes according to those programs.

In FIG. 1, a converter CON and target data TD (Target Data) in the memory 24 are shown by broken lines. This means that the converter CON and the target data TD may be stored in the memory 24 or not stored in the memory 24. The broken line of the converter CON and the target data TD has the same meaning for other devices (e.g., a mediation server 70, a data server 80, a PC 64), which are to be described later. Moreover, the target data TD is the data of a print target. Further, the converter CON is a program for converting the target data TD to print data that the printer 54 is capable of interpreting.

(Configuration of LAN 51)

The LAN 51 is a network built, e.g., within a company where the user of the mobile device 10 works. The LAN 51 includes an access point (called "AP" below) 52, the printer 54 and a router 56. The devices 52, 54, 56 within the LAN 51 are connected by cable so as to be capable of communicating with each other.

The AP 52 functions as a relay point (i.e., AP) for wireless communication. The printer 54 performs printing according to print data. Moreover, a data format (called "printer format of the printer 54" below) that the printer 54 is capable of interpreting (i.e., capable of printing) is predetermined. In the present embodiment, the printer format of the printer 54 is PDF. The router 56 has a NAT (Network Address Translation) function, and is connected to the Internet 4.

Moreover, in the state of FIG. 1, the mobile device 10 is capable of communicating with a device (e.g., the printer 54) within the LAN 51 via the AP 52. Further, in the state of FIG. 1, the mobile device 10 is capable of communicating with a device (e.g., the mediation server 70) via the AP 52 and the router 56.

(Configuration of LAN 61)

The LAN 61 is a network built, e.g., within a home where the user of the mobile device 10 lives. The LAN 61 includes a router 62 and the PC 64. The devices 62, 64 within the LAN 61 are connected by cable so as to be capable of communicating with each other.

The router 62 has a NAT function, and is connected to the Internet 4. Moreover, an application provided by the vendor of the printer 54 has been installed in the PC 64. The PC 64 is capable of performing various processes according to the application. For example, the PC 64 performs various processes for researching according to research indication data which will be described later (reference numbers 124, 164 of FIG. 6, FIG. 8). Further, for example, the PC 64 performs processes for printing according to print indication data which will be described later (200a of FIG. 9, etc.). Moreover, the PC 64 is capable of storing the converter CON and/or the target data TD.

(Configuration of Mediation Server 70)

The mediation server 70 is a server provided by the manufacturer of the printer 54. The mediation server 70 performs various processes for mediating (i.e., supporting) the printing to be performed by the printer 54. For example, the mediation server 70 performs various processes for researching according to research indication data which will be described later (reference numbers 124, 144, 164 of FIGS. 6 to 8). Further, for example, the mediation server 70 performs processes for printing according to print indication data which will be described later (200a of FIG. 9, etc.). Moreover, the mediation server 70 is capable of storing the converter CON and/or the target data TD.

(Configuration of Data Server 80)

The data server 80 is, e.g., a web server on the Internet 4. The data server 80 is capable of storing the target data TD.

(Communication Paths Between Devices)

Next, the communication paths between the devices 10, 54, 64, 70 will be described with reference to FIG. 2. The one-way arrows (R2A, R2B, R3A, R3B, R4A, R4B) within FIG. 2 indicate that data can be directly communicated (can be sent) from the device at the starting point of the arrow to the device at the ending point of the arrow. For example, the arrow R2B indicates that data can be directly communicated from the mediation server 70 to the printer 54. Moreover, "can be directly communicated" means that data can be communicated from the device at the starting point of the arrow to the device at the ending point of the arrow without passing through any other device from among the plurality of devices 10, 54, 64, 70. Consequently, for example, the arrow R2B means that data can be communicated from the mediation server 70 to the printer 54 without passing through the other devices 10, 64. Moreover, "can be directly communicated" may refer to communication via an AP, router, etc., or may refer to communication not via such AP, router, etc.

Figure 2:
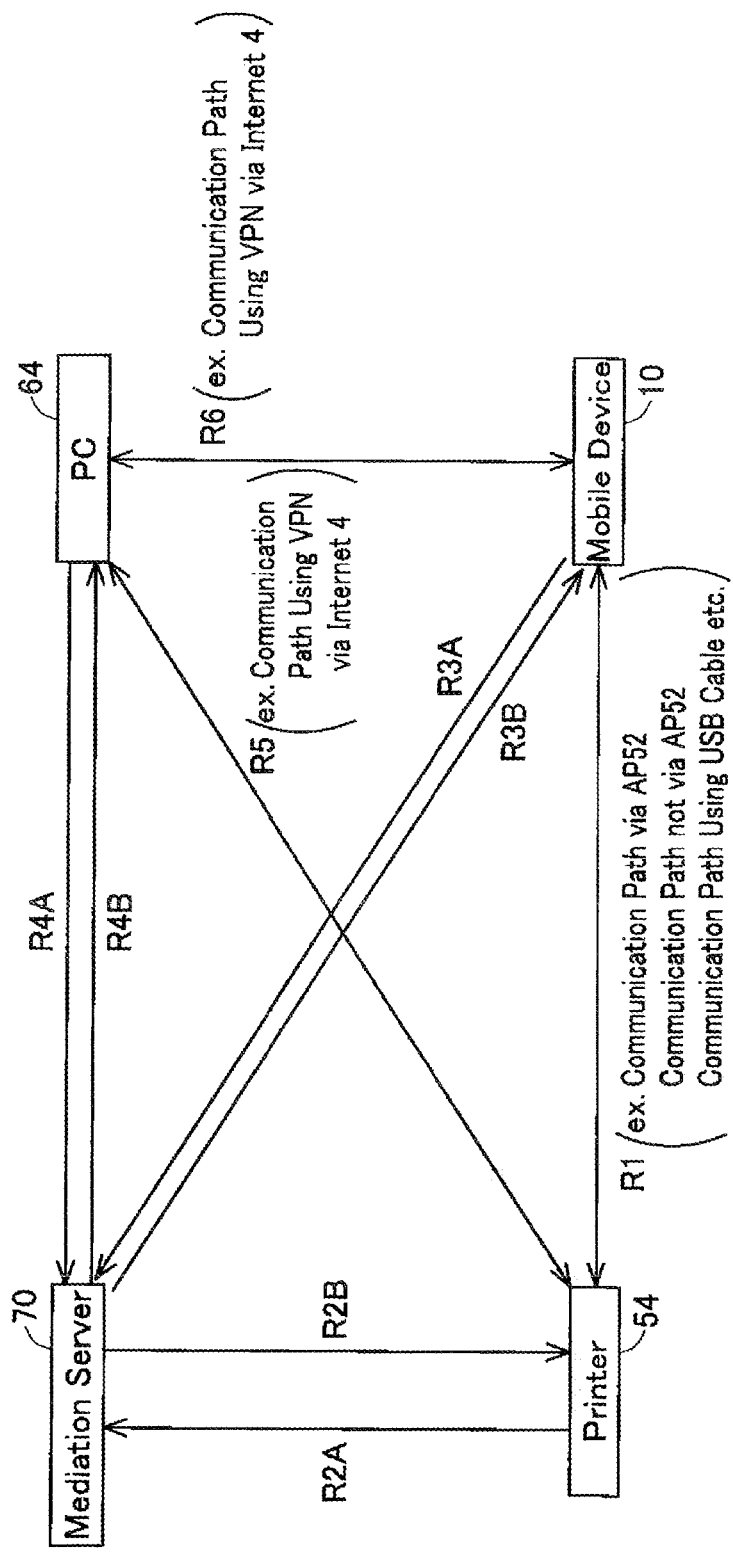
FIG. 2 schematically shows communication paths.

Moreover, the one-way arrows within FIG. 2 do not mean that the device at the starting point of the arrow can directly communicate data to the device at the ending point of the arrow in response to a request from the device at the ending point of the arrow (i.e., the one-way arrows do not mean so-called pull communication). The one-way arrows mean that the device at the starting point of the arrow can directly communicate data to the device at the ending point of the arrow even without the request from the device at the ending point of the arrow (i.e., the one-way arrows mean so-called push communication). Further, in the one-way arrows in FIG. 2, the letter "A" (e.g., R2A) is affixed to an arrow representing a communication direction from a LAN side to an Internet side, and the letter "B" (e.g., R2B) is affixed to an arrow representing a communication direction from the Internet side to the LAN side.

Further, the two-way arrows (R1, R5, R6) within FIG. 2 indicate that the two devices at both ends of the arrow can directly communicate (can send) data to each other. For example, the arrow R6 indicates that data can be directly communicated from the PC 64 to the mobile device 10, and that data can be directly communicated from the mobile device 10 to the PC 64. Moreover, below, the ability of data to be directly communicated between two devices may be expressed by the phrase "a communication path has been established".

(Communication Path R1)

In case, for example, the LAN 51 (see FIG. 1) that includes the printer 54 is a network compliant with a Wi-Fi (registered trademark), etc., the mobile device 10 is capable of communicating wirelessly with the AP 52 within the LAN 51 according to Wi-Fi (registered trademark). In this case, the communication path R1 can be established since a state that the mobile device 10 and the printer 54 are capable of directly communicating with each other can be built. Further, the communication path R1 can also be established e.g. in a case where both the mobile device 10 and the printer 54 are capable of communicating wirelessly using the standards of Bluetooth (registered trademark), IrDA (Infrared Data Association), etc. Further, the communication path R1 can also be established e.g. in a case where the mobile device 10 and the printer 54 are connected by a cable such as a USB cable, etc. That is, the communication path R1 may be established by wireless communication via the AP 52 within the LAN 51 (Wi-Fi (registered trademark), etc.), may be established by wireless communication not via the AP 52 within the LAN 51 (Bluetooth (registered trademark), etc.), and may be established by wired communication (USB cable, etc.).

(Communication Paths R2A, R2B)

If, for example, the printer 54 within the LAN 51 (see FIG. 1) is capable of accessing the Internet 4 via the router 56, the communication path R2A from the printer 54 to the mediation server 70 can be established. Further, e.g. in a case where a setting has been setup in the printer 54 to allow push communication from the mediation server 70 to the printer 54, a communication path R2B from the mediation server 70 to the printer 54 can be established.

(Communication Paths R3A, R3B)

If, for example, the mobile device 10 is capable of accessing the Internet 4 via the LAN 51 (see FIG. 1), a communication path R3A from the mobile device 10 to the mediation server 70 can be established. Further, if, for example, the mobile device 10 is capable of using an Internet communication line provided by a communications provider for the mobile device 10, the communication path R3A from the mobile device 10 to the mediation server 70 can be established. Further, e.g., in a case where a setting has been setup in the mobile device 10 to allow push communication from the mediation server 70 to the mobile device 10, a communication path R3B from the mediation server 70 to the mobile device 10 can be established.

(Communication Paths R4A, R4B)

A communication path R4A from the PC 64 to the mediation server 70 can be established if, e.g., the PC 64 within the LAN 61 (see FIG. 1) is capable of accessing the Internet 4 via the router 62. Further, a communication path R4B from the mediation server 70 to the PC 64 can be established in case a setting has been setup in the PC 64 to allow push communication from the mediation server 70 to the PC 64.

(Communication Path R5)

A communication path R5 can be established in a case where, e.g., a VPN (Virtual Private Network) that passes via the Internet 4 has been built between the printer 54 within the LAN 51 (see FIG. 1) and the PC 64 within the LAN 61.

(Communication Path R6)

A communication path R6 can be established in a case where e.g., a VPN that passes via the Internet 4 has been built between the PC 64 within the LAN 61 (see FIG. 1) and the mobile device 10.

As described above, in the present embodiment, the communication paths R1 to R6 can be built according to various communication methods. However, in a case where, e.g., the mobile device 10 is not capable of communication according to Wi-Fi (registered trademark), Bluetooth (registered trademark), etc., and further does not have an interface for inserting a USB cable, the communication path R1 might not be established. Further, in a case where, e.g., a setting has not been setup in the printer 54 to allow push communication from the mediation server 70 to the printer 54, the communication path R2B might not be established. That is, not all the communication paths R1 to R6 will necessarily be established. In view of this fact, in the present embodiment, the processes FIGS. 3 to 8 shown below are performed, causing the printer 54 to perform the print of the image represented by the target data TD.

Figure 3:
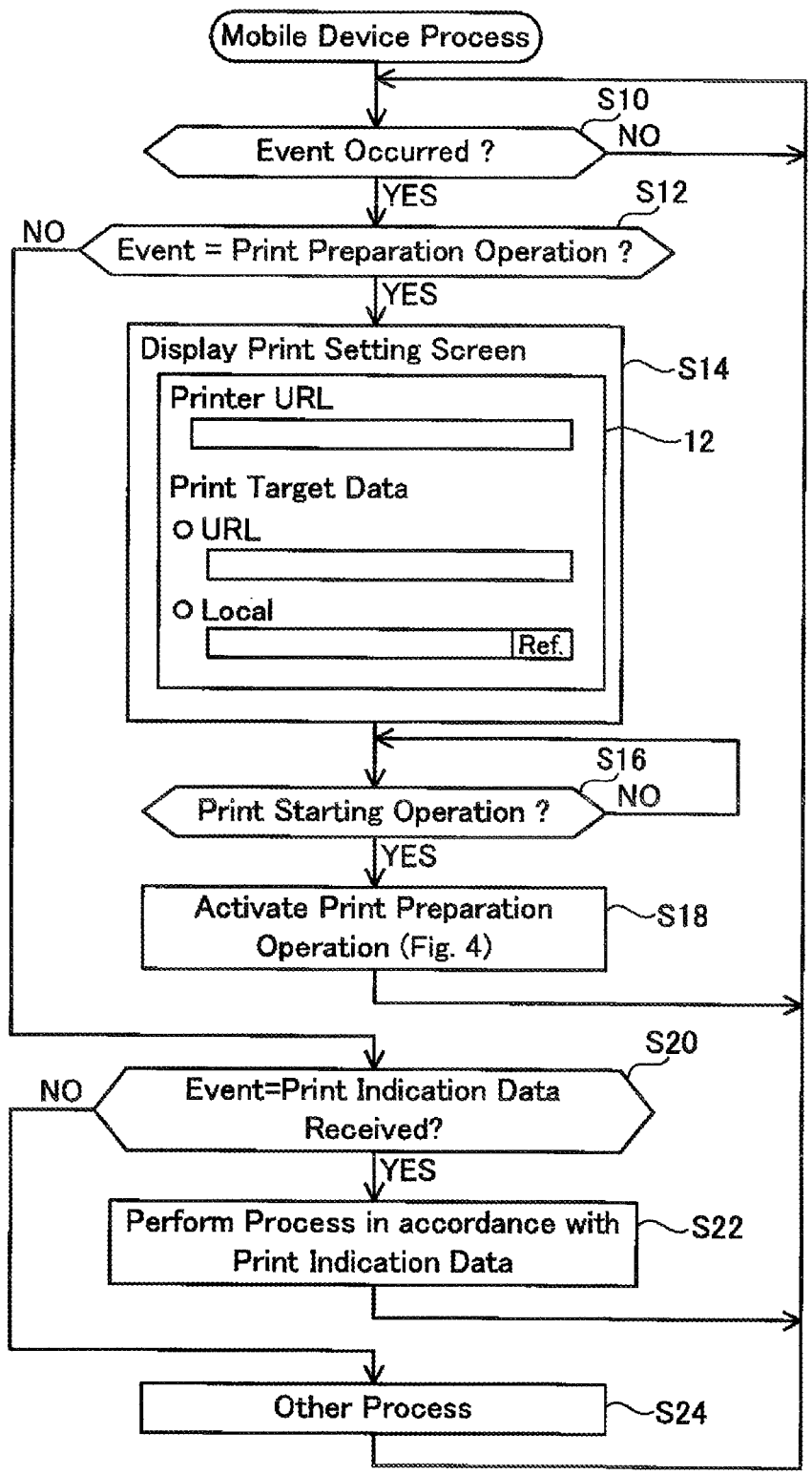
FIG. 3 shows a flowchart of a process performed by a mobile device.

(Mobile Device Process of FIG. 3)

As shown in FIG. 3, in S10, the controlling unit 20 (see FIG. 1) of the mobile device 10 monitors whether an event has occurred. For example, the user can operate the operating unit 14 of the mobile device 10, to perform an operation for activating the print application 26. In this case, the controlling unit 20 determines that an event has occurred (YES in S10), further determines that a print preparation operation has been performed (YES in S12), and proceeds to S14. Moreover, the processes S14 to S22 below (further, the processes of FIGS. 4 to 8) are performed according to the print application 26. On the other hand, the processes S10, S12 and S24 are performed according to, e.g., an OS program.

In S14, the controlling unit 20 displays a print setting screen in the displaying unit 12. The print setting screen includes a printer specification field and a data specification field. The user can operate the operating unit 14 to input, into the printer specification field, the URL of the printer that is to perform the printing. In the present embodiment, the description will continue using, as an example, the case in which the URL of the printer 54 (see FIG. 1) within the LAN 51 was input.

Further, the data specification field includes two radio buttons. One of the radio buttons corresponds to an external URL input field for inputting the URL of the target data TD present outside the mobile device 10, and the other of the radio buttons corresponds to an internal URL input field for inputting the URL (i.e., a pathname) of the target data TD present inside the mobile device 10 (the target data TD stored in the memory 24). The user can operate the operating unit 14 to select the one of the radio buttons and, further, can input the URL of the target data TD present outside the mobile device 10 into the external URL input field. Further, the user can operate the operating unit 14 to select the other of the radio buttons and, further, can operate a "reference" button. In this case, the pathnames (file names) of a plurality of items of data present within the mobile device 10 are displayed in the displaying unit 12, and the user can select the pathname of the target data TD from among the pathnames of the plurality of items of data.

Next, the user can operate the operating unit 14 to perform a print starting operation. In this case, the controlling unit 20 determines that the print starting operation has been performed (YES in S16), and proceeds to S18. In S18, the controlling unit 20 activates a print preparation process (see FIG. 4) as a process that is a separate task from the process of FIG. 3. When S18 ends, the process returns to S10.

Moreover, the mobile device 10 may receive print indication data, which is to be described later (see reference number 200a of FIG. 9, etc.). In this case, the controlling unit 20 determines that an event has occurred (YES in S10), further determines that the print indication data has been received (YES in S20), and proceeds to S22. In S22, a specific process performing unit 50 (see FIG. 1) performs a process according to the received print indication data. Moreover, details of the process S22 will be described later in detail.

Moreover, in case an event has occurred that is different from performing the print preparation operation and receiving the print indication data, in S24 the controlling unit 20 performs a process corresponding to that event.

Figure 4:
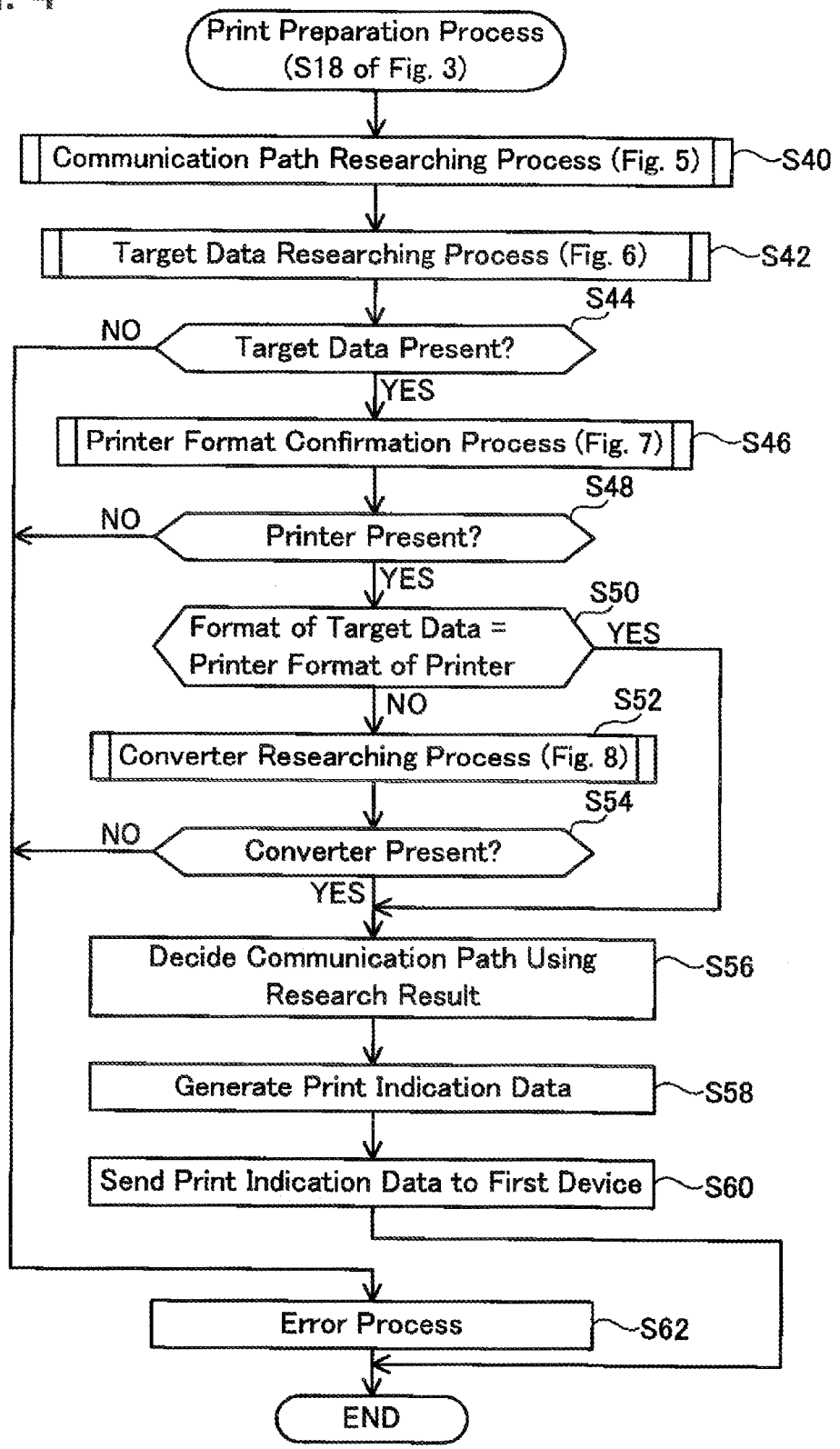
FIG. 4 shows a flowchart of a print preparation process.

(Print Preparation Process of FIG. 4)

In the print preparation process that was activated in S18 of FIG. 3, the controlling unit 20 first performs a communication path researching process in S40, as shown in FIG. 4.

Figure 5:
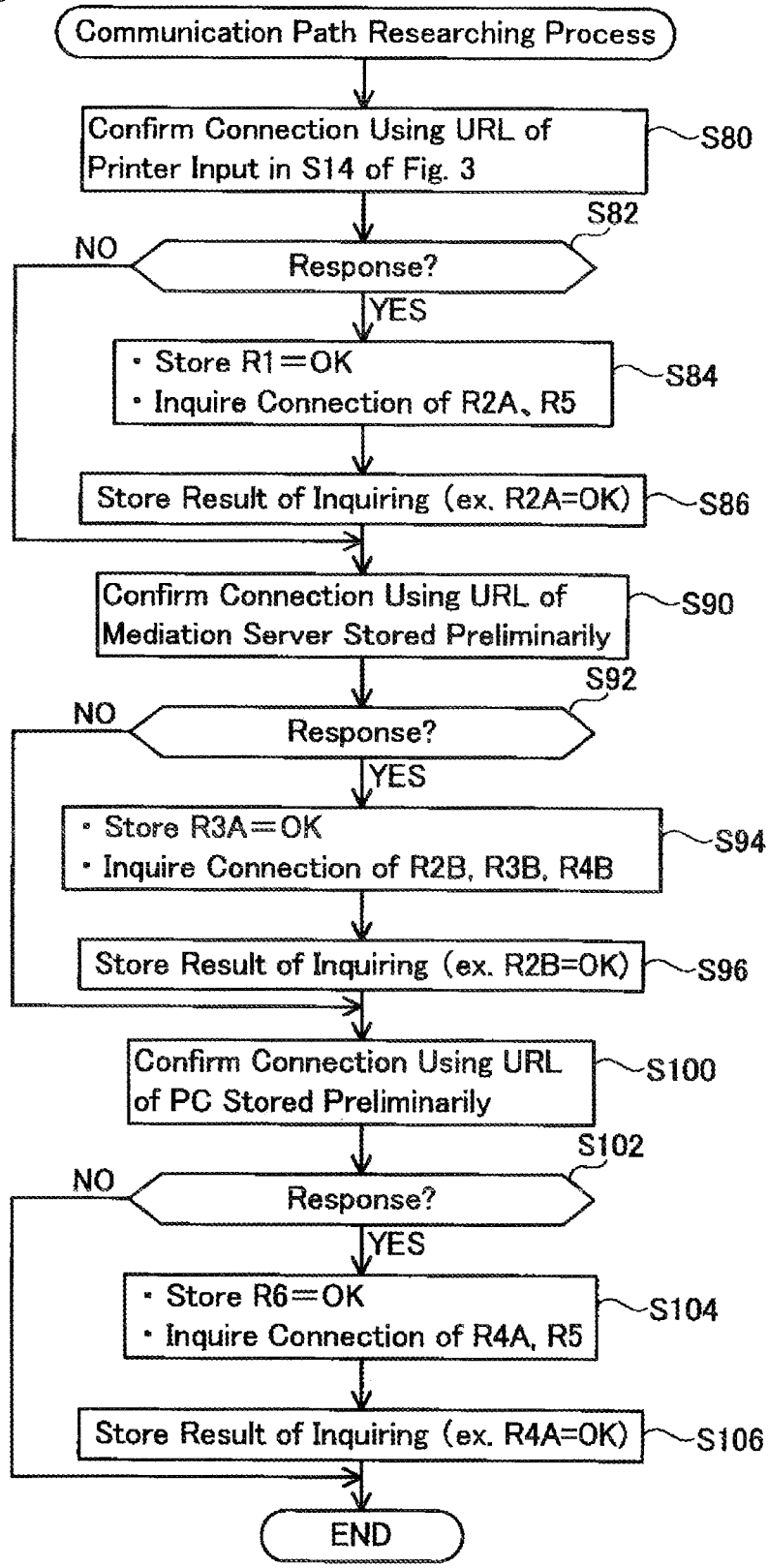
FIG. 5 shows a flowchart of a communication path researching process.

(Communication Path Researching Process of FIG. 5)

In the communication path researching process performed in S40 of FIG. 4, as shown in FIG. 5, a first confirming unit 42 (see FIG. 1) sends, in S80, a confirmation signal with the URL of the printer 54, which was input in S14 of FIG. 3 as the destination.

In a case where the communication path R1 (see FIG. 2) between the mobile device 10 and the printer 54 has been established, the printer 54 receives the confirmation signal sent from the mobile device 10, and sends a response signal to the mobile device 10. On the other hand, in case the communication path R1 between the mobile device 10 and the printer 54 has not been established, the printer 54 cannot receive a confirmation signal sent from the mobile device 10, and does not send a response signal to the mobile device 10. In S82, the first confirming unit 42 monitors that the response signal is received from the printer 54. In a case where the response signal is received from the printer 54 (the case of YES in S82), the process proceeds to S84, and in a case where the response signal is not received from the printer 54 (the case of NO in S82), the process proceeds to S90.

In S84, a storage controlling unit 46 (see FIG. 1) stores information indicating that the communication path R1 has been established (R1=OK) in the memory 24. Further, in S84, the second acquiring unit 44 (see FIG. 1) inquires to the printer 54 whether or not the communication paths R2A and R5 have been established. Moreover, the user of the mobile device 10 stores the URL of the mediation server 70 and the URL of the PC 64 in advance in the mobile device 10. In S84, the second acquiring unit 44 sends an inquiry signal to the printer 54, this inquiry signal including the URL of the mediation server 70 and the URL of the PC 64 stored in advance in the mobile device 10.

Upon receiving the inquiry signal, the printer 54 sends a confirmation signal with the URL of the mediation server 70 and the URL of the PC 64 as respective destinations. In a case where a response signal is received from the mediation server 70, the printer 54 sends information to the mobile device 10 indicating that the communication path R2A has been established (R2A=OK). Further, in a case where a response signal is received from the PC 64, the printer 54 sends information to the mobile device 10 indicating that the communication path R5 has been established (R5=OK).

In S84, the second acquiring unit 44 of the mobile device 10 acquires information (R2A=OK, etc.) from the printer 54. Then, in S86, the storage controlling unit 46 stores the information (R2A=OK, etc.) acquired from the printer 54 in the memory 24. That is, the storage controlling unit 46 stores information indicating that a communication path has been established in the memory 24. Moreover, in the present embodiment, information indicating that a communication path has not been established is not stored in the memory 24. This point is the same for other communication paths, which will be described below. When S84 ends, the process proceeds to S90.

In S90, the first confirming unit 42 sends a confirmation signal with the URL of the mediation server 70, which was stored in advance in the mobile device 10, as the destination. Then, in S92, the first confirming unit 42 monitors that a response signal is received from the mediation server 70. In a case where the response signal is received from the mediation server 70 (the case of YES in S92), in S94 the storage controlling unit 46 stores information, in the memory 24, indicating that the communication path R3A has been established (R3A=OK). Further, in S94, the second acquiring unit 44 inquires to the mediation server 70 whether or not the communication paths R2B, R3B, R4B have been established. Specifically, the second acquiring unit 44 sends an inquiry signal to the mediation server 70. This inquiry signal including the URL of the printer 54 which was input in S14 of FIG. 3, the URL of the mobile device 10, and the URL of the PC 64 which was stored in advance in the mobile device 10.

Upon receiving the inquiry signal, the mediation server 70 sends a confirmation signal with the URL of the printer 54, the URL of the mobile device 10, and the URL of the PC 64 as respective destinations. In a case where a response signal is received from the printer 54, the mediation server 70 sends information, to the mobile device 10, indicating that the communication path R2B has been established (R2B=OK). In a case where a response signal is received from the mobile device 10, the mediation server 70 sends information, to the mobile device 10, indicating that the communication path R3B has been established (R3B=OK). Further, in a case where a response signal is received from the PC 64, the mediation server 70 sends information, to the mobile device 10, indicating that the communication path R4B has been established (R4B=OK).

In S94, the second acquiring unit 44 of the mobile device 10 acquires information from the mediation server 70 (R2B=OK, etc.). Then, in S96, the storage controlling unit 46 stores the information acquired from the mediation server 70 (R2B=OK, etc.) in the memory 24. When S94 ends, the process proceeds to S100.

In S100, the first confirming unit 42 sends a confirmation signal with the URL of the PC 64, which was stored in advance in the mobile device 10, as the destination. Then, in S102, the first confirming unit 42 monitors that a response signal is received from the PC 64. In a case where a response signal is received from the PC 64 (the case of YES in S102), in S104 the storage controlling unit 46 stores information, in the memory 24, indicating that the communication path R6 has been established (R6=OK). Further, in S104, the second acquiring unit 44 inquires to the PC 64 whether or not the communication paths R4A, R5 have been established. Specifically, the second acquiring unit 44 sends an inquiry signal to the PC 64. This inquiry signal includes the URL of the mediation server 70, which was stored in advance, and the URL of the printer 54 which was input in S14 of FIG. 3.

Upon receiving the inquiry signal, the PC 64 sends a confirmation signal with the URL of the mediation server 70 and the URL of the printer 54 as respective destinations. In a case where a response signal is received from the mediation server 70, the PC 64 sends information to the mobile device 10 indicating that the communication path R4A has been established (R4A=OK). In a case where a response signal is received from the printer 54, the PC 64 sends information to the mobile device 10 indicating that the communication path R5 has been established (R5=OK).

In S104, the second acquiring unit 44 of the mobile device 10 acquires information (R4A=OK, etc.) from the PC 64. Then, in S106, the storage controlling unit 46 stores the information acquired from the PC 64 (R4A=OK, etc.) in the memory 24. When S106 ends, the communication path researching process ends. Moreover, an inquiry signal for researching whether or not the communication path R5 has been established can be sent in both S84 and S104. In this type of situation, and in a case where there are two differing research results relating to the communication path R5, i.e., one of the research results indicating that the communication path R5 has been established, and the other of the research results indicating that the communication path R5 has not been established, the controlling unit 20 may treat the situation as the communication path R5 not having been established. That is, in this case, the storage controlling unit 46 need not store information in the memory 24 indicating that the communication path R5 has been established.

(Continuation of Print Preparation Process of FIG. 4)

When the communication path researching process of S40 of FIG. 4 ends, the controlling unit 20 performs a target data researching process in S42.

Figure 6:
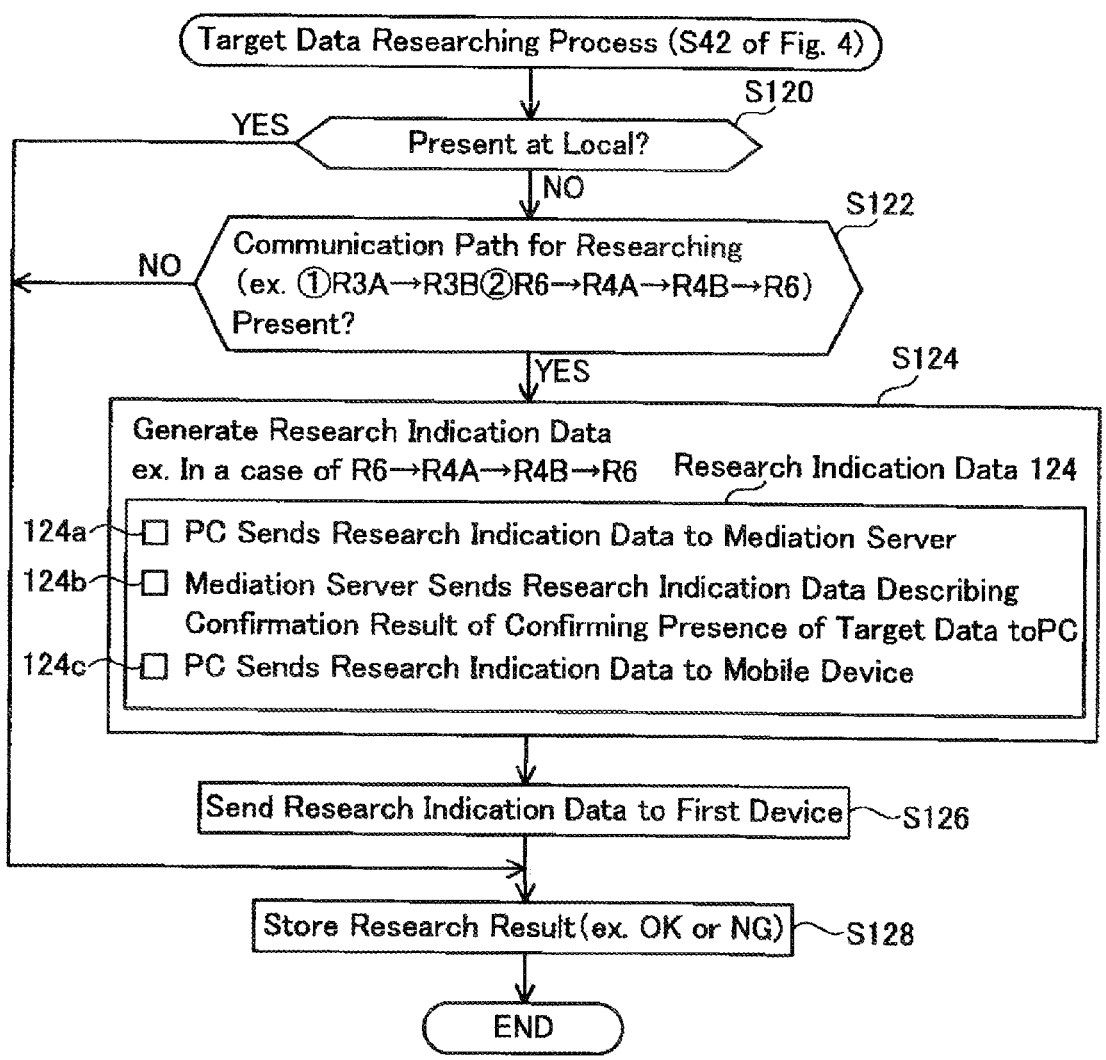
FIG. 6 shows a flowchart of a target data researching process.

(Target Data Researching Process of FIG. 6)

In the target data researching process performed in S42 of FIG. 4, as shown in FIG. 6, a second confirming unit 48 (see FIG. 1) determines in S120 whether or not the target data TD is present within the mobile device 10. In a case where the "reference" button included in the print setting screen was operated and then the pathname of the target data TD was selected in S14 of FIG. 3, the second confirming unit 48 determines that the target data TD is present within the mobile device 10 (YES in S120). In this case, in S128 the controlling unit 20 stores "OK" in the memory 24 as the research result of the target data researching process.

On the other hand, in a case where the URL of the target data TD was input into the external input field included in the print setting screen in S14 of FIG. 3, the second confirming unit 48 determines that the target data TD is not present within the mobile device 10 (NO in S120). In this case, in S122, the second confirming unit 48 specifies a communication path for researching whether or not the target data TD is actually present at the URL of the target data TD which was input in S14 of FIG. 3. The contents of the process S122 will be described in detail below.

In S14 of FIG. 3, the user might input the URL of the target data TD present in the PC 64. In this case, the URL of the target data TD input in S14 of FIG. 3 includes the URL of the PC 64 (which was stored in advance in the mobile device 10). In a case where the URL of the target data TD includes the URL of the PC 64, the second confirming unit 48 specifies a communication path for researching whether or not the target data TD is present in the PC 64 using the research result which was stored in the memory 24 in the communication path researching process of S40 of FIG. 4.

For example, in a case where information, indicating that the communication path R6 has been established, is stored in the memory 24, the second confirming unit 48 specifies a communication path in which research indication data (to be described) is sent using the communication path R6, and then a research result is acquired using the communication path R6. Moreover, below, the communication path in which the research indication data is sent and the research result is acquired in this manner is described as "R6→R6". Moreover, a similar expression is used not only for the research indication data, but also for other indication data (print indication data, etc., which is to be described later). Further, for example, in a case where information, indicating that the communication path R3A, R3B, R4A, R4B has been established, is stored in the memory 24, the second confirming unit 48 specifies "R3A→R4B→R4A→R3B".

On the other hand, in S14 of FIG. 3, the user might also input the URL of the target data TD which is present in the data server 80 on the Internet 4. In this case, the URL of the target data TD which was input in S14 of FIG. 3 does not include the URL of the PC 64. In a case where the URL of the target data TD does not include the URL of the PC 64, the second confirming unit 48 specifies a communication path for researching whether or not the target data TD is present on the Internet 4 using the research result which was stored in the memory 24 in the communication path researching process of S40 of FIG. 4.

For example, in case information, indicating that the communication path R3A, R3B has been established, is stored in the memory 24, the second confirming unit 48 specifies "R3A→R3B". Further, for example, in a case where information, indicating that the communication path R4A, R4B, R6 has been established, is stored in the memory 24, the second confirming unit 48 specifies "R6→R4A→R4B→R6". Moreover, in a case where a plurality of communication paths capable of performing research is present, the second confirming unit 48 specifies the communication path in which communication between the pair of devices is performed the least number of times. For example, in case either "R3A→R3B" or "R6→R4A→R4B→R6" is capable of performing research, the second confirming unit 48 specifies "R3A→R3B".

In S122, the second confirming unit 48 determines whether or not a communication path for researching the target data TD could be specified. In case of NO in S122, i.e., in a case where the research cannot be performed, in S128 the controlling unit 20 stores "NG" in the memory 24 as the research result of the target data researching process. On the other hand, in case of YES in S122, i.e., in a case where a communication path for researching the target data TD was specified, the second confirming unit 48 proceeds to S124.

In S124, the second confirming unit 48 generates research indication data including the URL of the target data TD which was input in S14 of FIG. 3 such that the research is performed according to the communication path specified in S122. In S124, an example is shown of the research indication data 124 generated in a case where "R6→R4A→R4B→R6" was specified in S122. The research indication data 124 includes a command indicating which device will perform which type of process is included in. The research indication data 124 includes three commands. Checkboxes 124a, 124b, 124c that correspond to the commands are provided. Moreover, the research indication data 124 is actually data in which commands are written according to a predetermined protocol. However, in order to make it easier to understand, in the present embodiment the research indication data 124 is shown in which a sentence is written (e.g. "PC sends research indication data to mediation server"). This point is the same for the research indication data 144, 164 which will be described later (see FIG. 7, FIG. 8) and the print indication data 200a of FIG. 9, etc.

Next, in S126, the second confirming unit 48 sends the research indication data 124 to the device which is to perform a process corresponding to a first command from among the three commands described in the research indication data 124. That is, the second confirming unit 48 sends the research indication data 124 to the PC 64 using the communication path R6. Thereby, the PC 64, etc. performs the processes below.

That is, the PC 64 checks the checkbox corresponding to the first command, and sends the research indication data 124 to the mediation server 70 using the communication path R4A. Then, according to a second command, the mediation server 70 sends a confirmation signal with the URL of the target data TD included in the research indication data 124 as the destination. By monitoring whether the response signal is present, the mediation server 70 confirms whether or not the target data TD is actually present at that URL. The mediation server 70 writes a confirmation result ("OK" or "NG") into the research indication data 124 and, further, checks the checkbox corresponding to the second command, and sends the research indication data 124 to the PC 64 using the communication path R4B. Then, the PC 64 checks the checkbox corresponding to a third command, and sends the research indication data 124 to the mobile device 10 using the communication path R6. Moreover, the checking of checkboxes is also performed for various indication data 144, 164, 200*a*, etc., which will be described later. However, a description thereof is omitted below.

The second confirming unit 48 acquires the research indication data 124 sent from the PC 64. By confirming the contents of the acquired research indication data 124, the second confirming unit 48 confirms whether the target data TD is actually present at the URL of the target data TD which was input in S14 of FIG. 3. Then, in S128, the controlling unit 20 stores "OK" or "NG" in the memory 24 as the research result of the target data researching process. When S128 ends, the target data researching process ends.

(Continuation of Print Preparation Process of FIG. 4)

When the target data researching process of S42 of FIG. 4 ends, the controlling unit 20 determines in S44 whether or not the research result of the target data researching process is "OK". In a case where the research result of the target data researching process is "NG" (in case of NO in S44), the controlling unit 20 skips the processes S46 to S60, then, in S62, displays a message in the displaying unit 12 indicating that printing cannot be performed, and ends the print preparation process.

On the other hand, in a case where the research result of the target data researching process is "OK" (in case of YES in S44), the controlling unit 20 performs a printer format confirmation process in S46.

Figure 7:
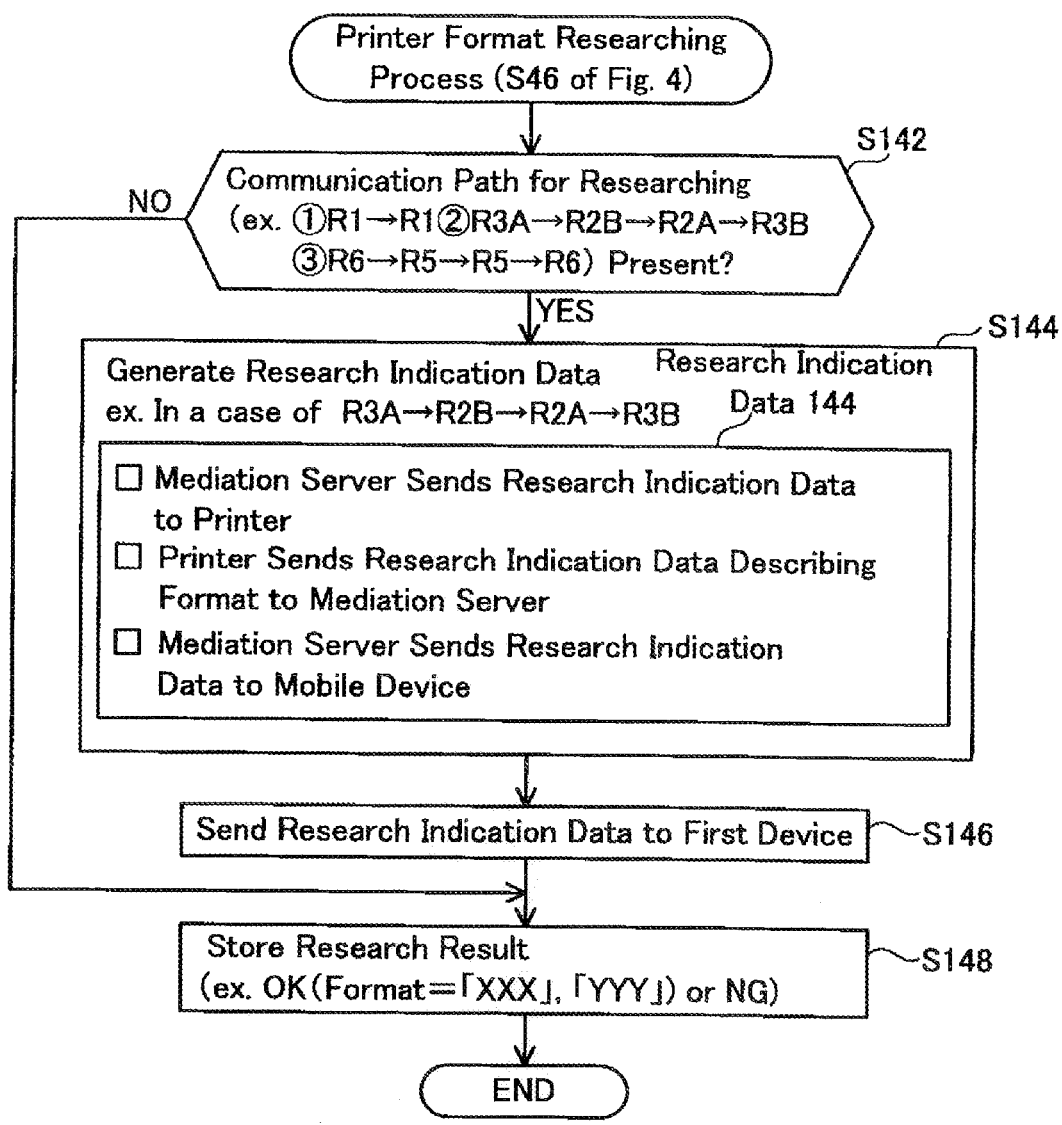
FIG. 7 shows a flowchart of a printer format researching process.

(Printer Format Researching Process of FIG. 7)

In the printer format researching process performed in S46 of FIG. 4, as shown in FIG. 7, in S142, the controlling unit 20 specifies, a communication path for researching the printer format of the printer 54 (the printer specified by the URL of printer which was input in S14 of FIG. 3). That is, using the research result stored in the memory 24 in the communication path researching process of S40 of FIG. 4, the controlling unit 20 specifies a communication path capable of communicating from the mobile device 10 via the printer 54 to the mobile device 10.

For example, in a case where information, indicating that the communication path R1 has been established, is stored in the memory 24, the controlling unit 20 specifies "R1→R1". Further, for example, in a case where information, indicating that the communication path R2A, R2B, R3A, R3B has been established, is being stored in the memory 24, the controlling unit 20 specifies "R3A→R2B→R2A→R3B". Moreover, in a case where a plurality of communication paths capable of performing research is present, the controlling unit 20 specifies a communication path in which communication between the pair of devices is performed the least number of times.

In S142, the controlling unit 20 determines whether or not a communication path for researching the printer format could be specified. In case of NO in S142, i.e., in a case where the research cannot be performed, in S148 the controlling unit 20 stores "NG" in the memory 24 as the research result of the printer format researching process. On the other hand, in case of YES in S142, i.e., in a case where the communication path for researching the printer format was specified, the controlling unit 20 proceeds to S144.

In S144, the controlling unit 20 generates research indication data such that research is performed according to the communication path which was specified in S142. In S144, an example is shown of the research indication data 144 generated in a case where "R3A→R2B→R2A→R3B" was specified in S142. As in the case of the research indication data 124 of FIG. 6, the research indication data 144 includes a command indicating which device will perform which type of process.

Next, in S146, the controlling unit 20 sends the research indication data 144 to the device which is to perform a process corresponding to a first command from among the three commands described in the research indication data 144. That is, the controlling unit 20 sends the research indication data 144 to the mediation server 70 using the communication path R3A. Thereby, the mediation server 70, etc. performs the processes below.

That is, according to the first command, the mediation server 70 sends the research indication data 144 to the printer 54 using the communication path R2B. Then, according to a second command, the printer 54 writes a format of print data that the printer 54 is capable of interpreting (i.e., "PDF", which is the printer format of the printer 54) into the research indication data 144 and, further, sends the research indication data 144 to the mediation server 70 using the communication path R2A. Then, according to a third command, the mediation server 70 sends the research indication data 144 to the mobile device 10 using the communication path R3B.

The controlling unit 20 acquires the research indication data 144 sent from the mediation server 70. By confirming the contents of the acquired research indication data 144, the controlling unit 20 specifies the printer format of the printer 54 (i.e., "PDF"). Then, in S148, the controlling unit 20 stores "OK" in the memory 24 as the research result of the printer format researching process, and stores the specified printer format in the memory 24. When S148 ends, the printer format researching process ends.

(Continuation of Print Preparation Process of FIG. 4)

When the printer format researching process of S46 of FIG. 4 ends, in S48, the controlling unit 20 determines whether or not the research result of the printer format researching process is "OK". In a case where the research result of the printer format researching process is "NG" (NO in S48), the controlling unit 20 skips the processes S50 to S60, and performs the process S62, ending the print preparation process.

On the other hand, in a case where the research result of the printer format researching process is "OK" (YES in S48), in S50 a determining unit 38 (see FIG. 1) determines whether or not the format of the target data TD is identical to the printer format of the printer 54 (i.e., "PDF") which was acquired in the printer format researching process. Moreover, based on the URL of the target data TD (e.g. "aaa.bbb.ccc.pdf") which was input in S14 of FIG. 3, the determining unit 38 acquires an extension of the target data TD (e.g. the final character string "pdf"), thereby specifying the format of the target data TD. In a case where the format of the target data TD is identical to the printer format of the printer 54 (YES in S50), the controlling unit 20 skips the processes S52, S54, and proceeds to S56. On the other hand, in a case where the format of the target data TD is identical to the printer format of the printer 54 (NO in S50), the controlling unit 20 performs a converter researching process in S52.

Figure 8:
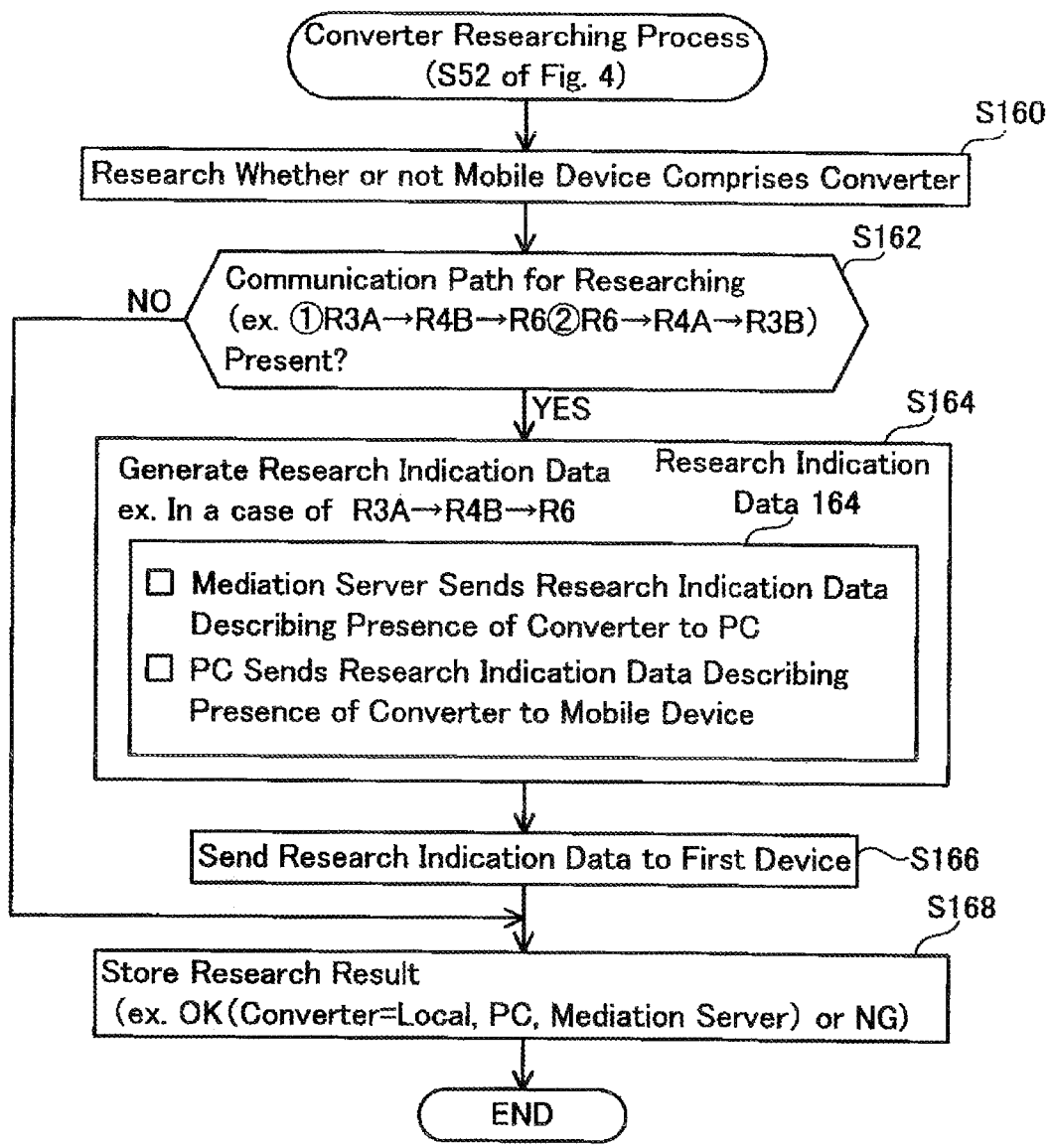
FIG. 8 shows a flowchart of a converter researching process.

(Converter Researching Process of FIG. 8)

In the converter researching process performed in S52 of FIG. 4, as shown in FIG. 8, the controlling unit 20 researches in S160 whether or not the mobile device 10 has the converter CON which is capable of converting the format of the target data TD to the printer format (i.e., "PDF") of the printer 54, which was acquired in S46 of FIG. 4.

Next, in S162, the controlling unit 20 specifies a communication path for researching the converter CON. As described above, the converter CON can be present in either the PC 64 or the mediation server 70. Consequently, using the research result which was stored in the memory 24 in the communication path researching process of S40 of FIG. 4, in S162 the controlling unit 20 specifies a communication path in which communication is possible from the mobile device 10, through the PC 64 and the mediation server 70, to the mobile device 10.

For example, in a case where information, indicating that the communication path R3A, R4B, R6 has been established, is stored in the memory 24, the controlling unit 20 specifies "R3→R4B→R6". Further, for example, in a case where information, indicating that the communication path R3B, R4A, R6 has been established, is stored in the memory 24, the controlling unit 20 specifies "R6→R4A→R3B". Moreover, in a case where a plurality of communication paths capable of performing research is present, the controlling unit 20 specifies the communication path in which communication between the pair of devices is performed the least number of times. Moreover, in a case where a communication path through both the PC 64 and the mediation server 70 is not present, but a communication path through only one of the PC 64 and the mediation server 70 is present, the controlling unit 20 specifies the communication path that passes through only one of the PC 64 or the mediation server 70.

In S162, the controlling unit 20 determines whether or not a communication path for researching the converter CON could be specified. In case of NO in S162, and in case it was confirmed in S160 that the mobile device 10 has the converter CON, in S168 the controlling unit 20 stores "OK" in the memory 24 as the research result of the printer format researching process, and stores "local" in the memory 24 as the location of the converter CON. Further, in case of NO in S162, and in a case where it was confirmed in S160 that the mobile device 10 does not have the converter CON, in S168 the controlling unit 20 stores "NG" in the memory 24 as the research result of the printer format researching process. On the other hand, in case of YES in S162, i.e., in a case where the communication path for researching the printer format was specified, the controlling unit 20 proceeds to S164.

In S164, the controlling unit 20 generates research indication data, which includes the format of the target data TD and the printer format of the printer 54, such that research is performed according to the communication path specified in S162. In S164, an example is shown of the research indication data 164 generated in a case where "R3A→R4B→R6" was specified in S162. As in the case of the research indication data 124, 144 of FIGS. 6 and 7, the research indication data 164 includes a command indicating which device will perform which type of process.

Then, in S166, a first acquiring unit 40 (see FIG. 1) sends the research indication data 164 to the device which is to perform a process corresponding to a first command from among the two commands described in the research indication data 164. That is, the first acquiring unit 40 sends the research indication data 164 to the mediation server 70 using the communication path R3A. Thereby, the mediation server 70, etc. performs the processes below.

According to the first command, the mediation server 70 writes information into the research indication data 164 indicating whether the mediation server 70 has the converter CON for converting the format of the target data TD into the printer format of the printer 54. The mediation server 70 further sends the research indication data 164 to the PC 64 using the communication path R4B. Then, according to the second command, the PC 64 writes information into the research indication data 164 indicating whether the PC 64 has the converter CON which is capable of converting the format of the target data TD into the printer format of the printer 54. The PC 64 further sends the research indication data 164 to the mobile device 10 using the communication path R6.

The first acquiring unit 40 acquires the research indication data 164 sent from the PC 64. As described above, the acquired research indication data 164 includes information indicating whether or not the PC 64 has the converter CON, and information indicating whether or not the mediation server 70 has the converter CON. In S168, the controlling unit 20 stores the research result of the printer format researching process in the memory 24 in accordance with the contents of the acquired research indication data 164. Moreover, in a case where "OK" is stored in the memory 24 as the research result of the printer format researching process, information indicating the location of the converter CON (i.e., information indicating one or more device from among "local", "PC", "mediation server") is also stored in the memory 24. When S168 ends, the converter researching process ends.

(Continuation of Print Preparation Process of FIG. 4)

When the converter researching process of S52 of FIG. 4 ends, the controlling unit 20 determines in S54 whether or not the research result of the converter researching process is "OK". In a case where the research result of the converter researching process is "NG" (in case of NO in S54), the controlling unit 20 skips the processes S56 to S60, and performs the process S62, ending the print preparation process.

On the other hand, in a case where the research result of the converter researching process is "OK" (in case of YES in S54), in S56 a deciding unit 32 (see FIG. 1) decides, using the research results stored in the memory 24 (the research results of S40, S42, S46, S52), a communication path for realizing a print of the target data TD, i.e., a communication path (called "specific communication path" below) for communicating the print indication data 200a, etc., which will be described later. Then, in S58, a generating unit 34 (see FIG. 1) generates the print indication data. Further, in S60, a sending unit 36 (see FIG. 1) sends the print indication data. The contents of the processes S56 to S60 corresponding to various cases will be described in detail below with reference to FIGS. 9 to 13. Moreover, in FIGS. 9 to 13, the broken line arrows indicate that a communication path corresponding to the arrow has been established, and the solid line arrows indicate the order in which the print indication data is communicated.

(Case A of FIG. 9)

Case A shows an example in which the converter CON is required because the format of the target data TD is not identical to the printer format (i.e., "PDF") of the printer 54 (because of NO in S50 of FIG. 4). In case A, the PC 64 stores the target data TD, and the mediation server 70 has the converter CON.

In S56, the deciding unit 32 decides the specific communication path such that the target data TD and converted data (this converted data having been obtained by the converter CON converting the target data TD) are communicated between the devices 10, 54, 64, 70 for a number of times (called "number of data communications" below) that is the minimum possible. Moreover, based on the research result of the converter researching process of S52 of FIG. 4, the deciding unit 32 specifies the device (the mediation server 70 in case A) that is to perform the converting process from the target data TD to the converted data such that the number of data communications is at a minimum. The deciding unit 32 decides the specific communication path such that the mediation server 70 that has the converter CON is present on the specific communication path.

Consequently, in the case A, the deciding unit 32 decides "R6→R4A→R3B→R1" as the specific communication path. In this case, the number of data communications is three (i.e., "PC 64→mediation server 70→mobile device 10→printer 54"). The following could also be considered as communication paths of the target data TD and the converted data: "PC 64→mobile device 10→mediation server 70 (the converted data is generated from the target data TD here)→mobile device 10→printer 54" or "PC 64→mediation server 70 (the converted data is generated from the target data TD here) →PC 64→mobile device 10→printer 54", etc. However, their number of data communications is four or more. Since, in the present embodiment, the deciding unit 32 decides the specific communication path such that the number of data communication is at a minimum, an increase in communication traffic of the network can be prevented.

In S58, the generating unit 34 generates the print indication data 200a according to the specific communication path decided in S56. As with the research indication data 124, 144, 164 of FIGS. 6 to 8, the print indication data 200a includes a command indicating which device will perform which type of process. The print indication data 200a includes four commands.

In S60, the sending unit 36 sends the print indication data 200a to the device which is to perform a process corresponding to a first command from among the four commands included in the print indication data 200a. That is, the sending unit 36 sends the print indication data 200a to the PC 64 using the communication path R6. Thereby, the PC 64, etc. sequentially performs the processes below according to the print indication data 200a.

That is, according to the first command, the PC 64 attaches the target data TD stored in the PC 64 to the print indication data 200a. The PC 64 further sends the print indication data 200a to the mediation server 70 using the communication path R4A. Then, according to a second command, the mediation server 70 generates the converted data from the target data TD using the converter CON. Thereby, the mediation server 70 can generate the converted data which has a format (i.e., "PDF") that the printer 54 is capable of interpreting. Further, the mediation server 70 sends the print indication data 200a, which has the converted data attached, to the mobile device 10 using the communication path R3B. In this case, the controlling unit 20 of the mobile device 10 determines YES in S20 of FIG. 3 and, in S22 of FIG. 3, the specific process performing unit 50 performs a process according to the third command to check the checkbox corresponding to the third command and then send the print indication data 200a to the printer 54 using the communication path R1. According to a fourth command, the printer 54 performs printing using the converted data attached to the print indication data 200a. Consequently, a print medium on which an image represented by the target data TD has been printed is output from the printer 54.

Figure 10:
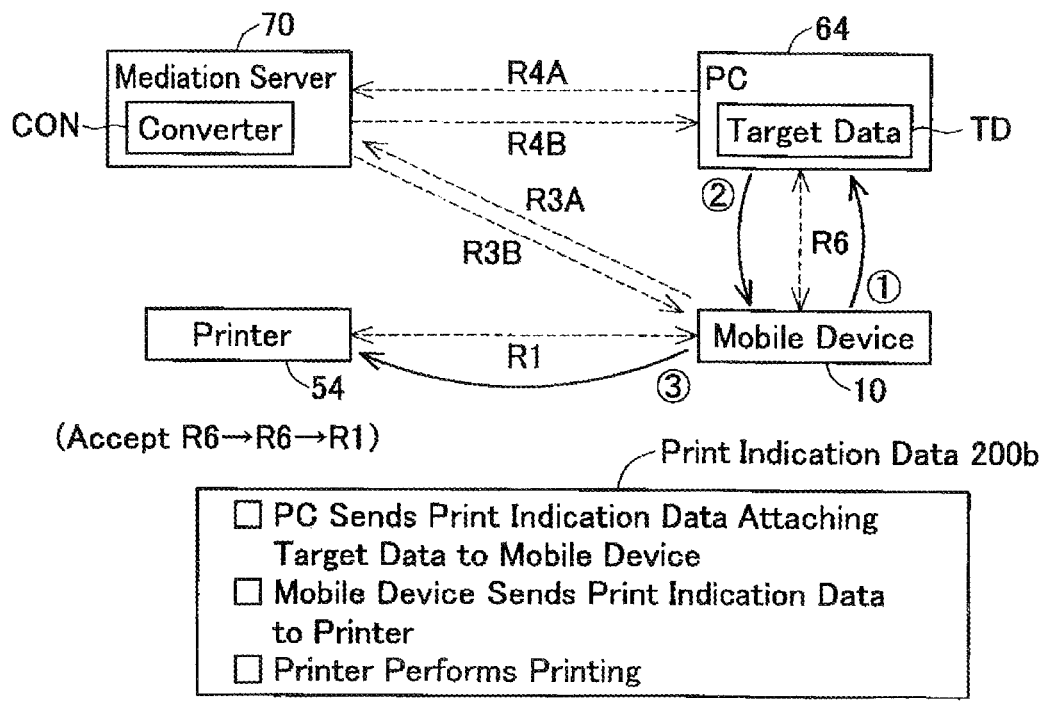
FIG. 10 shows a case B in which a converter is not required.

(Case B of FIG. 10)

Case B shows an example in which the converter CON is not required because the format of the target data TD is identical to the printer format (i.e., "PDF") of the printer 54 (because of YES in S50 of FIG. 4). In the case B, the PC 64 stores the target data TD.

In S56, the deciding unit 32 decides the specific communication path such that the number of data communications is at a minimum, and the mediation server 70 provided with the converter CON is not present on the specific communication path. Consequently, the deciding unit 32 decides "R6→R6→R1" as the specific communication path (i.e., the number of data communications is two). In S58, the generating unit 34 generates print indication data 200b. In S60, the sending unit 36 sends the print indication data 200b to the PC 64 using the communication path R6. Thereby, the PC 64, etc. sequentially performs the processes below according to the print indication data 200b.

That is, the PC 64 sends the print indication data 200b, which has the target data TD attached, to the mobile device 10 using the communication path R6. In this case, the controlling unit 20 of the mobile device 10 determines YES in S20 of FIG. 3 and, in S22 of FIG. 3, the specific process performing unit 50 sends the print indication data 200b to the printer 54 using the communication path R1. The printer 54 performs printing using the target data TD.

As is clear from the case A and case B, the mobile device 10 can appropriately decide the specific communication path in accordance with whether the format of the target data TD is identical to the printer format of the printer 54. In particular, in case B the specific communication path is decided that does not pass through the mediation server 70 provided with the converter CON, and consequently unnecessary communication through the mediation server 70 can be prevented. An increase in the communication traffic of the network can be prevented.

Figure 11:
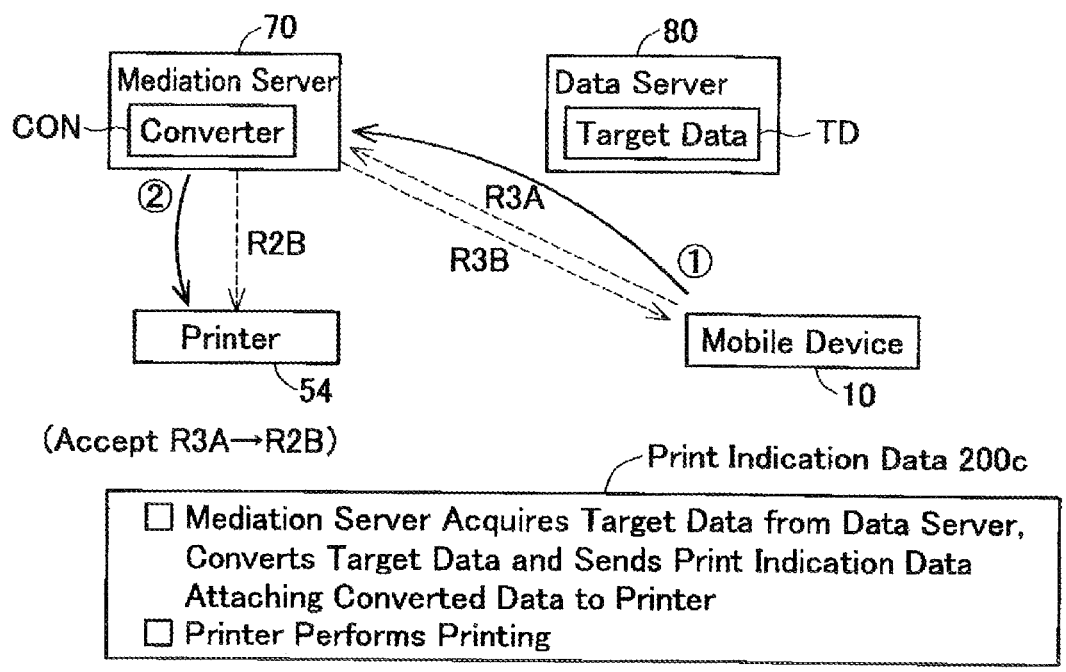
FIG. 11 shows a case C in which target data is present in a data server.

(Case C of FIG. 11)

Case C shows an example in which the target data TD is present in the data server 80 on the Internet 4. In the case C, the converter CON is required and the mediation server 70 is provided with the converter CON.

In S56, the deciding unit 32 decides the specific communication path such that the number of data communications is at a minimum, and the mediation server 70 provided with the converter CON is present on the specific communication path. Consequently, the deciding unit 32 decides "R3A→R2B" as the specific communication path (i.e., the number of data communications is one). In S58, the generating unit 34 generates print indication data 200c. In S60, the sending unit 36 sends the print indication data 200c to the mediation server 70 using the communication path R3A. Thereby, the mediation server 70, etc. sequentially performs the processes below according to the print indication data 200c.

That is, the mediation server 70 acquires the target data TD from the data server 80, and stores the target data TD temporarily in the memory of the mediation server 70. Further, the mediation server 70 generates converted data from the target data TD and sends the print indication data 200c, which has the converted data attached, to the printer 54 using the communication path R2B. The printer 54 performs printing using the converted data.

Figure 12:
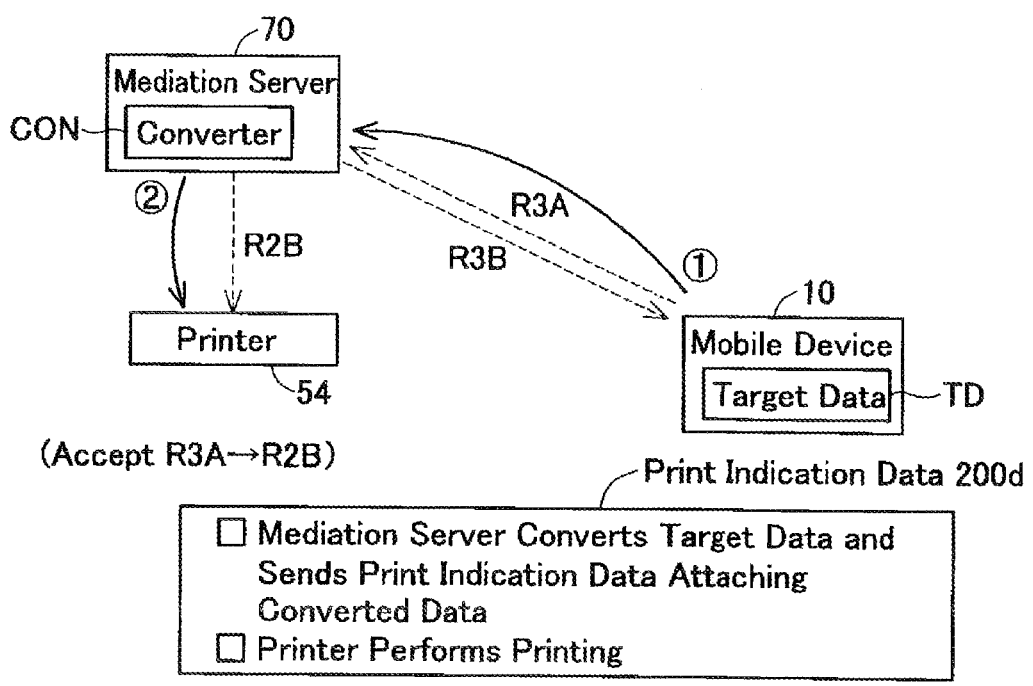
FIG. 12 shows a case D in which target data is present in a mobile device.

(Case D of FIG. 12)

Case D shows an example in which the target data TD is present in the mobile device 10. In the case D, the converter CON is required and the mediation server 70 has the converter CON.

In S56, the deciding unit 32 decides the specific communication path such that the number of data communications is at a minimum and the mediation server 70 provided with the converter CON is present on the specific communication path. Consequently, the deciding unit 32 decides "R3A→R2B" as the specific communication path (i.e., the number of data communications is two). In S58, the generating unit 34 generates print indication data 200d. In S60, the sending unit 36 attaches the target data TD stored in the memory 24 of the mobile device 10 to the print indication data 200d and, further, sends the print indication data 200d to the mediation server 70 using the communication path R3A. Thereby, the mediation server 70, etc. sequentially performs the processes below according to the print indication data 200d.

That is, the mediation server 70 generates converted data from the target data TD and sends the print indication data 200d, which has the converted data attached, to the printer 54 using the communication path R2B. The printer 54 performs printing using the converted data.

Figure 13:
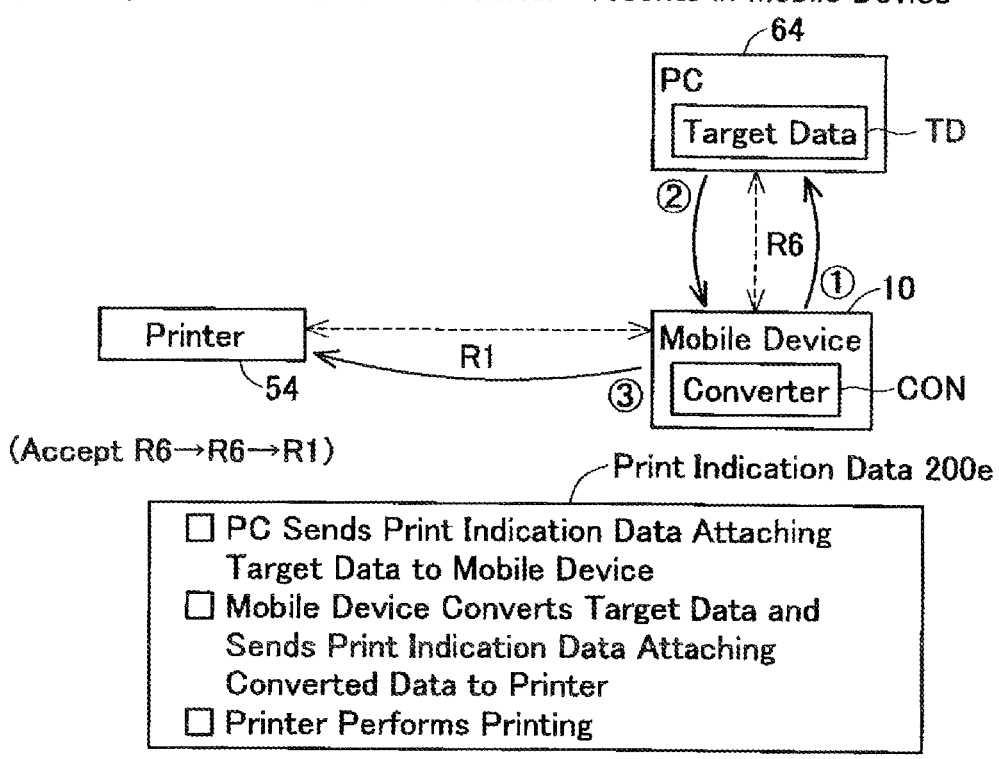
FIG. 13 shows a case E in which a converter is present in a mobile device.

(Case E of FIG. 13)

Case E shows an example in which the converter CON is required and the mobile device 10 is provided with the converter CON. In the case E, the target data TD is present in the PC 64.

In S56, the deciding unit 32 decides the specific communication path such that the number of data communications is at a minimum and the mobile device 10 provided with the converter CON is present on the specific communication path. Consequently, the deciding unit 32 decides "R6→R6→R1" as the specific communication path (i.e., the number of data communications is two). In S58, the generating unit 34 generates print indication data 200e. In S60, the sending unit 36 sends the print indication data 200e to the PC 64 using the communication path R6. Thereby, the PC 64, etc. sequentially performs the processes below according to the print indication data 200e.

That is, the PC 64 attaches the target data TD to the print indication data 200e and, further, sends the print indication data 200e to the mobile device 10 using the communication path R6. In this case, the controlling unit 20 of the mobile device 10 determines YES in S20 of FIG. 3 and, in S22 of FIG. 3, the specific process performing unit 50 generates converted data from the print indication data 200e and sends the print indication data 200e, which has the converted data attached, to the printer 54 using the communication path R1. The printer 54 performs printing using the converted data.

Effect of the Present Embodiment

According to the present embodiment, the mobile device 10 decides the specific communication path (S56 of FIG. 4) capable of supplying the target data TD or the converted data to the printer 54 using the research result in the memory 24 which was obtained by the communication path researching process (see FIG. 5) of S40 of FIG. 4. Consequently, as shown e.g. in the case A of FIG. 9, in a case where a communication path has not been established between the mediation server 70 and the printer 54, the mobile device 10 can decide the specific communication path which is definitely capable of supplying the target data TD or the converted data to the printer 54 without deciding a communication path which requires communication between the mediation server 70 and the printer 54. Further, based on the specific communication path which was decided, the mobile device 10 generates the print indication data 200a, etc., and then sends the print indication data 200a, etc. to a device which is to first perform a process (the PC 64 in the case of FIG. 9). Consequently, since the target data TD or the converted data is supplied reliably to the printer 54, the printer 54 can perform the print of the image represented by the target data TD. According to the present embodiment, the phenomenon can be prevented in which the print of the image represented by the target data TD cannot be performed.

The correspondence between elements of the present embodiment and elements of the present invention will be described. The printer 54 and the mobile device 10 are respectively examples of the "print device" and the "planning device". In the cases A, B, E, the PC 64 is an example of the "storage device". In the case C, the mediation server 70 which acquires the target data TD from the data server 80 and temporarily stores the target data TD is an example of the "storage device". Further, in the case D, the mobile device 10 is an example of the "storage device". Moreover, in the cases A, C, D, the mediation server 70 is an example of the "converting device", and in the case E, the mobile device 10 is an example of the "converting device". As is clear from the present embodiment, in the case D, the mobile device 10 corresponds to both the "planning device" and the "storage device", and in the case E, the mobile device 10 corresponds to both the "planning device" and the "converting device". That is, generally speaking, two or more devices from within the "plurality of devices" may be configured integrally.

Further, e.g., in the case A, the PC 64 is an example of the "first device". For example, in the research indication data 164 of FIG. 8, the PC 64 and the mediation server 70 are respectively examples of the "second device" and the "third device". For example, in the case A, the printer 54 is an example of the "fourth device". Further, the printer 54, the PC 64 and the mediation server 70 are examples of the "first type of device group". Consequently, the confirmation signal sent in S80, S90, S100 of FIG. 5 is an example of the "specific signal". Further, the device which sends the response signal to that confirmation signal is an example of the "first type of device".

Moreover, in the case A, checking the checkbox corresponding to the third command is an example of the "specific process", and in the case E, generating the converted data from the target data TD and checking the checkbox corresponding to the second command is an example of the "specific process". Moreover, the information stored in the memory 24 in S84, S86, S94, S96, S104, S106 of FIG. 5 is an example of the "communication information". Further, the target data TD or the converted data is an example of the "print data". That is, the "print data" may be the target data TD itself (see the case B), or may be the converted data generated from the target data TD (see the cases A, C to E). Generally speaking, the "print data" may be any data which is obtained from the target data TD and which has a data format that the print device is capable of interpreting.

Modified Embodiment 1

In the above embodiment, the plurality of elements 32 to 50 are all provided in the mobile device 10. However, the plurality of elements 32 to 50 do not need to all be provided in the mobile device 10. For example, the deciding unit 32 and the memory 24 may be provided in the mobile device 10, and the generating unit 34 and the sending unit 36 may be provided in a server on the Internet 4. Generally speaking, the plurality of elements (memory, deciding unit, generating unit, sending unit, etc.) constituting the "planning device" may be provided within one device, or may be provided in a distributed manner within two or more devices.

Modified Embodiment 2

In the above embodiment, "PDF" was adopted as the data format that the printer 54 is capable of interpreting. However, another data format (e.g. "PS", etc.) may be adopted.

Modified Embodiment 3

In the above embodiment, in S56 of FIG. 4, the deciding unit 32 decides the specific communication path such that the number of data communications is at a minimum. Instead, however, the deciding unit 32 may decide the specific communication path such that, e.g., telecommunications charges are at a minimum or the time until printing is shortest.

Modified Embodiment 4

In the above embodiment, in a case where the print command is input from the user (in case of YES in S12 of FIG. 3), the mobile device 10 researches whether the devices are capable of directly communicating, and stores the research result in the memory 24 (see FIG. 5). Instead, however, communication information indicating whether the devices are capable of directly communicating may be stored in advance in the memory 24 of the mobile device 10. For example, the user may store the communication information in advance in the memory 24.

Modified Embodiment 5

In the above embodiment, the memory 24 stores only the communication paths that are capable of directly communicating. Instead, however, only the communication paths that are not capable of directly communicating may be stored, or both the communication paths that are capable of directly communicating and the communication paths that are not capable of directly communicating may be stored distinctly. That is, generally speaking, the "communication information" may be any kind of information which relates to whether the two devices are capable of directly communicating.

Modified Embodiment 6

In the above embodiment, the mobile device 10 was adopted as an example of the "planning device". Instead, however, a PC, a server, a printer, a scanner, a fax machine, etc. may be adopted.

Modified Embodiment 7

In both S84 and S104 of FIG. 5, an inquiry signal is sent for researching whether the communication path R5 has been established and, in case the two research results relating to the communication path R5 differ, the controlling unit 20 may decide whether the communication path R5 has been established according to the research result which was obtained last (i.e., the research result obtained in S104). For example, it is possible that the communication path R5 had been established when the inquiry signal was sent in S84, but was disconnected before the inquiry signal was sent in S104. Further, a configuration is possible such that, in a case where the inquiry signal relating to the communication path R5 is sent in S84, an inquiry signal relating to the communication path R5 is not sent in S104.

Modified Embodiment 8

In the above embodiment, checkboxes are provided in the indication data, and the checkboxes corresponding to the processed commands are checked. Thereby, the devices can specify commands within the indication data that have not yet been processed. Instead of this configuration, the devices may delete the processed commands within the indication data. In the present modified embodiment, as well, the devices can specify commands within the indication data that have not yet been processed.

Modified Embodiment 9

Moreover, the function of the units 32 to 50 in the embodiment described above may be realized by software, as in the embodiment described above, or may be realized by hardware, such as a logic circuit, etc.

The invention claimed is:

1. A client device used in a system comprising a plurality of devices including a print device for performing a print of a target image represented by target data of a print target, a converting device for generating print data by performing a converting process on the target data, and the client device for performing print indication for causing the print device to perform the print of the target image, the client device comprising:
   a processor; and
   an instruction memory storing computer-readable instructions therein, the computer-readable instructions, when executed by the processor, causing the client device to perform:
   causing an information memory to store, for each combination of two devices among the plurality of devices, communication information related to whether or not the two devices composing the combination are capable of directly communicating;
   acquiring a data format the print device is capable of interpreting;
   deciding a specific communication path using the communication information in the information memory, the specific communication path being a path capable of supplying the print data acquired from the target data to the print device;
   sending the print indication to a first device among the plurality of devices, the first device being a device that is to perform a process performed first among one or more processes performed sequentially for realizing the print of the target image;
   determining, using the acquired data format, whether the converting device is to generate the print data by performing the converting process on the target data;
   accepting a print instruction for causing the print device to print;
   confirming, when the print instruction has been accepted, whether or not the client device is capable of directly communicating with the print device and whether or not the client device is capable of directly communicating with the converting device by sending a specific signal to the print device and converting device respectively and monitoring to receive a response signal;
   acquiring, from the print device and/or the converting device, information related to whether or not the print device and the converting device are capable of directly communicating with each other;
   confirming whether or not the print device and the converting device are capable of directly communicating with each other using the received information related to whether or not the print device and the converting device are capable of directly communicating with each other; and
   causing the information memory to store the communication information using a result of the confirmation using the specific signal and the information from the print device and/or the converting device; wherein:
   in a case where it is determined that the converting device is to generate the print data, and it is confirmed that the client device is capable of directly communicating with the converting device, and the print device and the converting device are capable of directly communicating with each other, the deciding includes deciding the specific communication path such as directly sending the target data to the converting device in order to cause the converting device to generate the print data and to directly send the generated print data to the print device and cause the print device to perform the print of the target image using the print data sent from the converting device, and in a case where it is determined that the converting device is not to generate the print data, and it is confirmed that the client device is capable of directly communicating with the print device, the deciding includes deciding the specific communication path such as directly sending the target data to the print device in order to cause the print device to perform the print of the target image using the target data and not to send the target data to the converting device;

wherein the plurality of devices includes a storing device configured to store the target data; and wherein the computer-readable instructions, when executed by the processor, cause the client device to further perform:

confirming whether or not the client device is capable of directly communicating with the storing device;

acquiring, from the storing device and/or the converting device, information related to whether or not the storing device and the converting device are capable of directly communicating with each other;

confirming whether or not the storing device and the converting device are capable of directly communicating with each other using the received information related to whether or not the storing device and the converting device are capable of directly communicating with each other;

acquiring, from the storing device and/or the print device, information related to whether or not the storing device and the print device are capable of directly communicating with each other; and confirming whether or not the storing device and the print device are capable of directly communicating with each other using the received information related to whether or not the storing device and the print device are capable of directly communicating with each other, in a case where it is determined that the converting device is to generate the print data, and it is confirmed that the client device is capable of directly communicating with the converting device and the print device respectively, the storing device and the converting device are capable of directly communicating with each other, and the print device and the converting device are not capable of directly communicating with each other, the deciding includes deciding the specific communication path such that the storing device directly sends the target data to the converting device in order to cause the converting device to generate the print data and directly send the generated print data to the client device, and the client device sends the print data to the print device in order to cause the print device to perform the print of the target image using the print data, and in a case where it is determined that the converting device is to generate the print data, and it is confirmed that the client device is capable of directly communicating with the converting device, the client device is not capable of directly communicating with the print device, the storing device and the converting device are capable of directly communicating with each other, and the print device and the converting device are capable of directly communicating with each other, the deciding includes deciding the specific communication path such that the storing device directly sends the target data to the converting device and the converting device directly sends the generated print data to the print device.

2. The client device as in claim 1, wherein
the deciding includes deciding the specific communication path such that a number of data communications is at a minimum.

3. A non-transitory computer readable medium including a computer program for a client device used in a system comprising a plurality of devices including a print device for performing a print of a target image represented by target data of a print target, a converting device for generating print data by performing a converting process on the target data, and the client device for performing print indication for causing the print device to perform the print of the target image, the computer program including instructions for ordering a computer mounted on the client device to perform:

causing an information memory to store, for each combination of two devices among the plurality of devices, communication information related to whether or not the two devices composing the combination are capable of directly communicating;

acquiring a data format the print device is capable of interpreting;

deciding a specific communication path using the communication information in the information memory, the specific communication path being a path capable of supplying the print data acquired from the target data to the print device;

sending the print indication to a first device among the plurality of devices, the first device being a device that is to perform a process performed first among one or more processes performed sequentially for realizing the print of the target image;

determining, using the acquired data format, whether the converting device is to generate the print data by performing the converting process on the target data;

accepting a print instruction for causing the print device to print;

confirming, when the print instruction has been accepted, whether or not the client device is capable of directly communicating with the print device and whether or not the client device is capable of directly communicating with the converting device by sending a specific signal to the print device and converting device respectively and monitoring to receive a response signal;

acquiring, from the print device and/or the converting device, information related to whether or not the print device and the converting device are capable of directly communicating with each other;

confirming whether or not the print device and the converting device are capable of directly communicating with each other using the received information related to whether or not the print device and the converting device are capable of directly communicating with each other; and causing the information memory to store the communication information using a result of the confirmation using the specific signal and the information from the print device and/or the converting device; wherein:

in a case where it is determined that the converting device is to generate the print data, and it is confirmed that the client device is capable of directly communicating with the converting device, and the print device and the converting device are capable of directly communicating with each other, the deciding includes deciding the specific communication path such as directly sending the target data to the converting device in order to cause the converting device to generate the print data and to directly send the generated print data to the print device and cause the print device to perform the print of the target image using the print data sent from the converting device, and in a case where it is determined that the converting device is not to generate the print data, and it is confirmed that the client device is capable of directly communicating with the print device, the deciding includes deciding the specific communication path such as directly sending the target data to the print device in order to cause the print device to perform the print of the target image using the target data and not to send the target data to the converting device;

wherein the plurality of devices includes a storing device configured to store the target data; and wherein the instructions cause the computer mounted on the client device to further perform:

confirming whether or not the client device is capable of directly communicating with the storing device;

acquiring, from the storing device and/or the converting device, information related to whether or not the storing device and the converting device are capable of directly communicating with each other;

confirming whether or not the storing device and the converting device are capable of directly communicating with each other using the received information related to whether or not the storing device and the converting device are capable of directly communicating with each other;

acquiring, from the storing device and/or the print device, information related to whether or not the storing device and the print device are capable of directly communicating with each other; and confirming whether or not the storing device and the print device are capable of directly communicating with each other using the received information related to whether or not the storing device and the print device are capable of directly communicating with each other, in a case where it is determined that the converting device is to generate the print data, and it is confirmed that the client device is capable of directly communicating with the converting device and the print device respectively, the storing device and the converting device are capable of directly communicating with each other, and the print device and the converting device are not capable of directly communicating with each other, the deciding includes deciding the specific communication path such that the storing device directly sends the target data to the converting device in order to cause the converting device to generate the print data and directly send the generated print data to the client device, and the client device sends the print data to the print device in order to cause the print device to perform the print of the target image using the print data, and in a case where it is determined that the converting device is to generate the print data, and it is confirmed that the client device is capable of directly communicating with the converting device, the client device is not capable of directly communicating with the print device, the storing device and the converting device are capable of directly communicating with each other, and the print device and the converting device are capable of directly communicating with each other, the deciding includes deciding the specific communication path such that the storing device directly sends the target data to the converting device and the converting device directly sends the generated print data to the print device.

* * * * *